United States Patent [19]

Mallee et al.

[11] Patent Number: 5,470,391
[45] Date of Patent: Nov. 28, 1995

[54] STARCH-BASED TEXTURIZING AGENT

[75] Inventors: Francis M. Mallee, Acton; Eugene T. Finocchiaro, Boston, both of Mass.

[73] Assignee: Opta Food Ingredients, Inc., Bedford, Mass.

[21] Appl. No.: 138,541

[22] Filed: Oct. 15, 1993

Related U.S. Application Data

[63] Continuation-in-part of Ser. No. 900,899, Jun. 18, 1992, abandoned.

[51] Int. Cl.$^6$ .................. C13K 1/06; C13D 3/12; C08B 30/00
[52] U.S. Cl. .................. 127/38; 127/55; 127/67; 127/69; 127/71
[58] Field of Search .................. 127/38, 55, 67, 127/69, 71

[56] References Cited

U.S. PATENT DOCUMENTS

| | | | |
|---|---|---|---|
| 3,086,890 | 4/1963 | Sarko et al. | 127/69 |
| 3,238,064 | 3/1966 | Macarus et al. | 127/69 |
| 3,515,591 | 6/1970 | Feldman et al. | 127/32 |
| 3,650,770 | 3/1972 | Marcotta et al. | 99/139 |
| 3,666,557 | 5/1972 | Jensen et al. | 127/32 |
| 3,836,677 | 9/1974 | Freck et al. | 426/103 |
| 3,962,465 | 6/1976 | Richter et al. | 426/48 |
| 3,986,890 | 10/1976 | Richter et al. | 127/38 |
| 4,252,900 | 2/1981 | Muller et al. | 435/161 |
| 4,452,978 | 6/1984 | Eastman | 536/111 |
| 4,510,166 | 4/1985 | Lenchin et al. | 426/565 |
| 4,623,549 | 11/1986 | Katt et al. | 426/548 |
| 4,971,723 | 11/1990 | Chiu | 252/315 |
| 4,992,539 | 2/1991 | Portnoy et al. | 536/120 |
| 5,051,271 | 9/1991 | Iyengar et al. | 426/658 |
| 5,131,953 | 7/1992 | Kasica et al. | 127/65 |
| 5,324,532 | 6/1994 | Stute et al. | 426/578 |

FOREIGN PATENT DOCUMENTS

| | | | |
|---|---|---|---|
| 0120498 | 10/1984 | European Pat. Off. | A23C 20/00 |
| 0366898 | 5/1990 | European Pat. Off. | C08B 30/14 |
| 0372184 | 6/1990 | European Pat. Off. | C12P 19/16 |
| 0441494 | 8/1991 | European Pat. Off. | A23D 7/00 |
| 0443844 | 8/1991 | European Pat. Off. | A23L 1/09 |
| 0480433 | 4/1992 | European Pat. Off. | A23L 1/325 |
| 0495407 | 7/1992 | European Pat. Off. | C08B 37/00 |
| 0529892 | 3/1993 | European Pat. Off. | A23C 1/09 |
| 0554818 | 8/1993 | European Pat. Off. | A23C 1/08 |
| 89/12403 | 12/1989 | WIPO | A23L 1/10 |
| 91/02463 | 3/1991 | WIPO | A23L 1/0534 |
| 92/02147 | 2/1992 | WIPO | A23L 1/05 |
| 93/03629 | 3/1993 | WIPO | C08B 30/20 |

OTHER PUBLICATIONS

International Search Report, PCT/US94/11654.

*Primary Examiner*—Paul Lieberman
*Assistant Examiner*—Patricia L. Hailey
*Attorney, Agent, or Firm*—Hamilton, Brook, Smith & Reynolds

[57] ABSTRACT

A novel starch-based texturizing agent is disclosed. The texturizing agent is produced from high amylose (>40%) starch under specific conditions of temperature, pressure and shear. The texturizing agent functions to provide several fat-like attributes such as structure, viscosity, smoothness and opacity to reduce and/or essentially replace the fat content in foods. Additionally the texturizing agent can be used in full fat foods as a stabilizer. Foods containing the novel texturizing agents include mayonnaise, spoonable and pourable salad dressings, yogurt, cottage cheese, sour cream, cream cheese, peanut butter, frosting, cheesecake, mousse and several sauces, among others. The texturizing agent can also be incorporated into drug and cosmetic formulations.

29 Claims, 2 Drawing Sheets

High Amylose Corn Starch (10% d.s.)

↓

Heat to 138°C; Low Shear 90 min (Fully Solubilized)

↓

Cool to 90°C

↓

Filter at 90°C

↓

Cool to 55°C; High Shear

↓

Store at 4°C

↓

Texturizing Agent

High Amylose Corn Starch (10% d.s.)

Heat to 138°C; Low Shear 90 min (Fully Solubilized)

Cool to 90°C

Filter at 90°C

Cool to 55°C; High Shear

Store at 4°C

Texturizing Agent

STARCH-BASED TEXTURIZING AGENT

RELATED APPLICATION

This is a Continuation-in-Part of U.S. patent application Ser. No. 07/900,899, filed Jun. 18, 1992, now abandoned, the entire teachings of which are incorporated herein by reference.

BACKGROUND OF THE INVENTION

The health advantages of a diet low in fat are well documented. Attempts to formulate low-fat versions of food products that typically contain a high percentage of fat are made difficult due to the many functional roles that fats play in foods. Removal of fat from a food often leads to negative effects on structure and organoleptic properties such as smoothness, flavor profile, opacity, lubricity, etc. The consumer demand for low-fat foods that retain the quality of the corresponding full-fat formulation has led to the development of a large number of potential texturizing agents and fat replacers based on proteins, polyesters, and a variety of other approaches.

Several examples of fat replacers derived from starch include: a partially debranched starch used for providing fat-like texture, forming opaque clouds and producing thermoreversible gels (EP Application 0 372 184 A1 and U.S. Pat. No. 4,971,723 issued to Chiu); cold-water soluble and pregelatinized converted starches (by acid, enzyme or oxidation treatment) for use as fat or oil replacement in ice cream and mayonnaise (U.S. Pat. No. 4,510,166 issued to Lenchin et al.); enzyme-hydrolyzed thermoreversible starch gels as fat substitutes in mayonnaise, cream cheese, whipped cream and meat applications (U.S. Pat. Nos. 3,962,465 and 3,986,890 issued to Richter et al.); aqueous dispersion of granular starch hydrolysate (EP Application 0 443 844 A1 issued to Chiou et al.); macrocolloid carbohydrate particles for use in ice cream, yogurt, salad dressings, mayonnaise, coffee whitener and sour cream (PCT Application WO 89/12403 to Singer et al.); two-phase protein and carbohydrate fat substitute for use in salad dressings and cookie fillings (EP Application 0 441 494 A1 to Reimer); fat substitute comprising hydrated alginate and a complex carbohydrate (PCT Application WO 92/02147 to Shemer and Shemer); mixture of heat treated microcrystalline cellulose and xanthan gum used as a fat mimetic in frozen desserts and viscous and pourable salad dressings (PCT Application WO 91/02463 to Baer et al.); and insoluble modified starch used as a bulking agent, filler or texturizing agent in low-fat formulations (U.S. Pat. No. 5,051,271 issued to Iyengar et al.).

A number of methods have been developed to modify starches for use in food formulations and include: subjecting defatted amylose containing starch to high temperature and shear to disrupt the starch granules thereby producing a gel (U.S. Pat. No. 3,666,557 issued to Jensen and Long); cooking high amylose starch at 140°–170° C. to produce a solubilized cold water dispersible starch (U.S. Pat. No. 3,515,591 issued to Feldman et al.); cooking high amylose starch under shear at a temperature higher than the gelatinization temperature to produce a yellow gel (U.S. Pat. No. 3,836,677 issued to Freck et al.); and subjecting high amylose starches to a jet cooking/spray drying process to produce a pregelatinized starch (E.P. Application 0 366 898 A1 and U.S. Pat. No. 5,131,953 issued to Kasica and Eden).

SUMMARY OF THE INVENTION

The invention relates to methods for producing starch-based texturizing agents, to novel texturizing agents, and to food formulations containing the texturizing agents. The texturizing agents of this invention are derived from high amylose starch which has been processed under specific conditions of temperature, pressure and shear. The novel texturizing agents have unique properties in that they can stabilize fat containing food formulations and can be used to fully or partially replace the fat content of foods that traditionally contain fat.

According to the method of the invention, the starch-based texturizing agent is made by reducing dissolved oxygen in a slurry of high amylose starch in an aqueous medium under inert atmosphere to reduce formation of off-flavor and off-color generated in subsequent steps; heating the slurry under agitating conditions at a temperature sufficient to disrupt starch granules in the slurry and to substantially solubilize the starch therein without significant degradation; filtering the solubilized starch to further reduce off-flavor and off-color; subjecting the filtered solution to high shear; and reducing the temperature of the solution to a temperature and for a period of time sufficient for the starch to retrograde to attain essentially maximum viscosity and/or gel strength. The deflavored, decolored starch paste can be used directly in food formulations or dried and later rehydrated. The structural and functional properties of the texturizing agent can be tailored to the specific end use by varying the process parameters such as the concentration of the starting materials, the conditions of time, temperature, pressure, pH and shear at the various stages of the process.

The resulting texturizing agent is retrograded, insoluble in water, exhibits both microparticulate- and gel-like structural and functional properties, is white in color and exhibits no off-flavors typical of starch products which have been exposed to high temperature processing or chemical modification. The hydrated product exhibits a high degree of stability, i.e., no syneresis was observed during refrigerated storage for two months in the absence of microbial contamination. The stability of the texturizing agent regarding syneresis is novel in that most food starches are chemically-modified in order to prevent exclusion of water from the starch polymer upon retrogradation over time, a phenomenon which reduces the shelf-life of starch-containing products.

The texturizing agents of the present invention provide a safe and cost effective product for use in foods and, alternatively, in drug and cosmetic applications. The functionality of the texturizing agent as a fat replacer and stabilizer is achieved without chemical modification of the starch polymer, does not necessitate the use of numerous adjunct ingredients, and is stable for use in a variety of food processing schemes such as high temperature cooking, baking, freezing, whipping, extrusion, pasteurization, HTST (high temperature, short time) processing, retorting, etc. In full fat products, the texturizing agents provide improved mouthfeel, body and stability. The food formulation containing the texturizing agents of the present invention exhibit excellent freeze/thaw and frozen storage stability, shelf stability and resistance to shear and thermal abuse.

Among the major issues facing food producers that employ currently available texturizers/fat replacers are the negative effects on taste due to the delivery of off-flavors, the masking of the foods inherent flavor and flavor delivery in the mouth by the texturizers/fat replacer. Key differences between the texturizing agents of the present invention and others are their lack of off-flavor, minimal masking of flavors, and minimal effects on flavor profile.

The versatile texturizing agents of this invention function to fully or partially replace fat in a variety of food products which typically contain fat in their formulation. The texturizing agents function to provide structure, opacity, viscosity, stability and acceptable organoleptic attributes with performance approximating the qualities of the corresponding full fat versions. The texturizing agents of the present invention have been shown to function well in both laboratory and commercial plant processing schemes and equipment.

DETAILED DESCRIPTION OF THE INVENTION

The invention relates to methods for producing starch-based texturizing agents, to the novel texturizing agents themselves, and to stabilized, full-fat food formulations or food formulations in which the fat content has been fully or substantially replaced by the starch-based texturizing agents. For purposes of the present invention, the term "texturizing agents" will be used to describe products derived from high amylose (>40% amylose) starch which has been processed under specific conditions of temperature, pressure and shear described herein.

According to the method of this invention, texturizing agents are prepared from a high amylose starch which contains greater than about 40% amylose, and preferably about 70% amylose. The high amylose starch can be obtained from a variety of plant sources, including but not limited to peas, corn and barley. The starting material may be a product of the milling of whole grains in which the non-starch components of the grain have been removed. The milled starch product may be obtained in a wet or dry form. A number of commercial sources of high amylose starch include AMYLOMAIZE VII®, (approx. 70% amylose; American Maize, Hammond, Ind.) and HYLON VII® (National Starch, Bridgewater, N.J.). The amylose-containing starch starting material can either have a low fat content (less than about 1% fat) or it may contain fat. Regardless of fat content, the cooking step should be performed in an inert atmosphere to prevent oxidation of the fat and the solubilized starch filtered to remove a substantial fraction of the fat and protein.

Figure 1:
FIG. 1 is a schematic representation of one embodiment for making the texturizing agent of this invention.
Figure 1:
Figure 1:
Figure 1:
Figure 1:
Figure 1:

The method for producing the novel texturizing agents generally involves: deaerating a slurry of a high amylose starch starting material, for example, by dearrating the sample under evacuation and inert gas sparging; cooking the slurry under conditions of time, temperature, pressure, pH, ionic strength and shear sufficient to solubilize the starch by fully disrupting the starch granules while minimizing generation of objectionable side products which contribute off-flavor and off-color or substantially degrading the starch polymer; filtering the solubilized starch to remove a substantial portion of non-starch components such as lipid and protein; homogenizing the filtrate; and cooling of the fully solubilized starch under controlled conditions of time, temperature and shear to yield a thixotropic gel. The gel can be used directly in food formulations or it can be dried to reduce the moisture content of the gel to provide a dry, free-flowing powder. The dry powder may be used directly or can be rehydrated prior to use. Each of these steps are discussed in detail below, and additionally shown by way of a preferred embodiment in FIG. 1.

Specifically, the method involves preparing a starch slurry in an aqueous medium with a total high amylose starch content of from about 1 to about 30% (w/w) solids, preferably from about 5 to about 15% (w/w). For purposes of the present invention, "aqueous medium" is defined as water or a solution which is substantially water such as buffer, acid, base, salt, antioxidant, reducing agent, and/or chelating agent solutions or a blend of water with a miscible organic solvent, in an amount sufficient to inhibit oxidation of lipids present in the starch starting materials. It is preferred that the aqueous medium, such as water, be pretreated to remove any dissolved minerals. The starch may be dispersed at ambient temperature or after the aqueous medium has been heated.

The resulting slurry is aspirated or pumped into an evacuated reactor vessel equipped with appropriate stirring device for agitation during the cooking of the starch slurry. The slurry is then deaerated and sparged to remove gases (e.g., oxygen) and other volatile components. Removal of oxygen from the slurry is important to produce a product with minimal off-color and off-flavor, as ascertained by visual and sensory perception. This is achieved by subjecting the slurry to a vacuum, sparging with an inert gas such as argon or nitrogen using either a vented vessel or closed vessel, or any combination of techniques effective for removal of dissolved gases especially oxygen from the slurry. It is preferred that the dissolved oxygen content be less than 1 ppm to ensure that off-flavors resulting from oxidation are not perceived upon tasting. The deaerating step is carried out for a period of time necessary to insure removal of the bulk of the dissolved gases typically up to one hour, preferably, ten minutes. Other approaches to reduce off-flavors and off-colors may include, either alone or in combination, near complete removal of non-starch components from the starting material, the addition of antioxidants, reducing agents and or chelating agents to the slurry, or washing of the final product with aqueous or organic solvents, among other generally known methods.

After the oxygen content of the slurry has been reduced, the starch slurry is subjected to strictly controlled conditions of time, temperature, pressure, pH, ionic strength and shear, to fully disrupt the starch granules and solubilize the starch without substantial degradation of the starch polymer via carmelization, hydrolysis, etc. For the purposes of the present invention, the term "solubilize" refers to the absence of any detectable particulate matter, especially partially disrupted starch granules, when viewed under 400-fold magnification using a standard light microscope. The rate of heating, time duration at the final cook temperature (i.e., the temperature above the gelatinization temperature of starch), and shear rate in the reactor vessel affect the properties of the final product.

The slurry is typically heated from room temperature (approximately 22° C.) to from about 125° to about 150° C., with about 138° C. being preferred, under stirring over a time period which ranges from 1 to 120 minutes, preferably 45 minutes until starch granules are solubilized. The rate of stirring typically ranges from 250 to 450 revolutions per minute (rpm), and preferably 350 rpm. Variations in initial temperature and rate of heating affect the properties of the final gel product even though the total time at 138° C. is essentially unchanged.

The concentration of the high amylose starch solids in the reactor can be varied to yield products with different functional properties. For instance, texturizing agents produced at 5% starch on a dry solids basis (dsb) in the reactor yield final products of higher viscosity but lower opacity when compared to a texturing agent produced at 10% dsb under identical processing conditions. The differences in opacity and viscosity are apparent in both the gel per se and in final formulated food products, such as cheesecake and mayonnaise. In essence, the properties of the final texturizing agent are sensitive to relatively minor changes in any of the process parameters. This sensitivity to conditions in the reactor enables one to produce a variety of texturizing agents from a single starting material.

The final temperature of 138° C. for cooking of the starch is preferred to produce texturizing agents that possess smooth mouthfeel, high opacity, and acceptable organoleptic properties. The complete disruption and solubilization of the starch is monitored by periodic sampling of small aliquots from the reactor over time and examination of the slurry under magnification (e.g., 400×) for presence or absence of starch granules. The slurry is heated at about 125° to about 150° C. (about 138° C. being preferred) for a time period which ranges typically from about 80 to about 120 minutes, preferably about 100 minutes. The heating step is considered complete when essentially all the starch granules have dissolved. The importance of the final temperature used in the present invention is illustrated by the following comparison. High amylose starch was heated to a maximum temperature in the reactor of 121° C. for 8 hours in the absence of shear. Even though the cooking process is carried out for a much longer time period than that of the present invention, this lower temperature does not allow for complete solubilization and disruption of the starch granules resulting in a product that contains relatively large particulates that exhibit grittiness and poor mouthfeel when tasted directly. In contrast, the higher temperature used in the present process insures full disruption of the starch granules and solubilization of the high amylose starch which yield a much smoother product.

An alternative method of heating is to directly inject steam into the slurry, such as can be accomplished in a jet cooker. Using the jet cooker, higher temperatures above the preferred range can be tolerated without affecting product properties if the contact time is sufficiently short.

Regulation of pH is also important to the texturizing properties of the product. According to the methods of this invention, the typical pH of the slurry before and after cooking is in the range from about 3 to about 7, preferably about 4.3 to about 4.7. The acidity of the slurry is controlled using appropriate food grade acidulants and alkali. Reducing the pH of the slurry to about 3 prior to processing results in a texturizing agent of much lower viscosity but much higher opacity compared to a texturizing agent prepared at pH 4.5 with all other conditions remaining constant. The combination of lower viscosity and higher opacity permits this version of the texturizing agent to be used in applications, such as non-dairy coffee creamers and pourable salad dressings.

Upon complete disruption of the starch granules and solubilization of the starch, the starch solution is cooled to a temperature below boiling and above about 90° C. Temperatures lower than about 90° C. will result in inefficient filtration as the starch retrogrades. Cooling can be accomplished by running cooling water through the reactor jacket. The cooled starch solution is then removed from the reactor vessel by expulsion under pressure, pumping, or other suitable method. On a small scale, the initial phase of cooling is typically performed in an ice bath until the temperature of the solution is in the range from 45° to 65° C., preferably 55° C.

The starch solution (at approximately 90° C.) is filtered to remove undissolved impurities, such as protein, fats and other compounds. Any filtration device having metal sieves, filter papers/cloths, filter pads or other filter media can be used. For example plate and frame filter presses, cartridge, bag and pressure leaf filters can be used. It is desirable to preheat the filters and filtering device to the tempterature of the slurry to be filtered prior to filtration. This will prevent premature retrogradation of the starch on the filter media and consequent blinding of the filter.

Charcoal filtration can be used after the starch solution is cooled to 90° C. This filtration step can be performed by adding activated carbon to the reactor vessel for approximately from about 10 to about 60 minutes, with 30 minutes contact time being preferred. In this case, filtering aids are recommended to completely remove carbon during a subsequent filtration. A secondary filter can also be installed after the primary filter to perform the carbon treatment. The secondary filter is fitted with activated carbon impregnated pads. Filtering aids such as CELITE® (Celite Corp.) can be used.

The filtered starch solution is collected in a receiving vessel or can be purged directly to a homogenizer for shearing as described below. Temperature of the slurry is maintained at about 90° C. in the vessel. The starch solution is subjected to high shear using a suitable technique to yield a smooth product. In this temperature range, the starch becomes insoluble and the suspension becomes opaque. Shear may be provided by piston, probe, jet, or valve homogenization (e.g., one and two stage), colloid milling, or similar technique. Conditions of shear will vary with the specific technique employed.

For the purpose of illustration, typical conditions for small-scale probe hemogenization (e.g., using a Polytron homogenizer, Brinkmann Instruments, Westburg, N.Y.) involve subjecting the cooling starch to a shear rate in the range of from about 5,000 to about 20,000 rpm, preferably about 10,000 rpm for a time duration of from about 5 to about 20 minutes, preferably about 8 minutes. For valve homogenization, processing in the pressure range of from about 1,000 to about 10,000 pounds per square inch (psi), preferably from about 2,000 to about 5,000 psi is sufficient to prepare a texturizing agent with properties that are suitable for use in food formulations. A preferred homogenization device is a single stage Gaulin homogenizer set at about 3000 psig pressure.

Excipients such as sugars, gums, other starches etc. that aid in rehydration or improve functionality in specific food applications can be optionally added at any point in the cooking, filtration and homogenization steps. Preferred excipients are any hydrolyzed starch-based carbohydrate, with low DE maltodextrin being most preferred. Excipients are not necessary if the resultant starch solution is used in wet form without prior drying and rehydration or if the dry powder is rehydrated under conditions of sufficient heat and shear to insure complete rehydration.

The homogenate is cooled to a temperature sufficient to allow a gel to form. The preferred temperature is about 4° C. Cooling should be carried out with a minimum of shear for maximum gel strength in the resultant gel; however, application of shear during the cooling step can be used to produce texturizing agents with varied functional properties, i.e., lower viscosity. For example, the homogenate can be stored in a temperature controlled cooler overnight. Alternatively, a belt flaker can be used to cool the homogenate. After completion of the cooling process, the resultant paste-like gel can be stored in the temperature range of from about 4° to about 50° C., preferably about 4° to about 22° C.

The texturizing agent can then be used directly in food formulations or dried by an appropriate method to a white, free-flowing powder. If the gel is dried, the preferred method is to use a spray dryer to achieve rapid drying. This preserves the functional characteristics and facilitates rehydration. For example centrifugal atomizers, pressure nozzles and two fluid nozzles can be used to atomize the starch gel. Alternative drying methods can be used and include drum drying and free drying.

The properties of the texturizing agent may be further modified at this point in the process by codrying with added constituents such as sugars, gums, maltodextrin, other starches, proteins, lipids, etc. The powder can be used directly in food formulations or rehydrated prior to use by addition of water and subjecting to suitable conditions of time, shear, temperature, etc.

The product of the invention is retrograded, insoluble in water, exhibits both microparticulate- and gel-like structural and functional properties, is white in color and exhibits essentially no off-flavors typical of starch products. The microstructure of the product as characterized by SEM can be described as a semi-continuous, macroporous gel network composed of filaments exhibiting a uniform diameter. The gel network is devoid of starch granules or granule fragments and its discontinuous portions appear as roughly spheroidal microparticles. The protein content is less than 0.3%, with 0.15% preferred. The total organic solvent (e.g., petroleum ether, diethyl ether, hexane, chloroform,) extractable material is less than 2% but is typically 1.2%. The hydrated product exhibits a high degree of stability and no syneresis during refrigerated storage in the absence of microbial contamination. The stability of the texturizing agent regarding syneresis is novel in that most starches must be chemically-modified in order to prevent exclusion of water from the starch polymer upon retrogradation over time.

The texturizing agents of the present invention provide a safe and cost effective product for use in foods and, alternatively, in drug and cosmetic applications. The functionality of the texturizing agent as a fat replacer is achieved without chemical modification of the starch polymer, does not necessitate the use of numerous adjunct ingredients, and is stable for use in a variety of food processing schemes including high temperature cooking, baking, freezing, whipping, extrusion, pasteurization, high temperature short time (HTST) processing, retorting, etc.

The versatile texturizing agents of this invention function in full-fat foods or can fully or partially replace fat in a variety of food products which typically contain a high percentage of fat in their formulation. Generally, the texturizing agent can be incorporated into food formulations at levels between about 0.1 and about 10%, preferably between about 0.5 and about 6% (w/v). Applications of the texturizing agents include viscous systems such as mayonnaise and spoonable and pourable salad dressings; confections such as cake frostings and fudge toppings; baked applications such as cheesecake; cold processed foods such as a no-bake cheesecake; processed cheese; cream- and cheese-based sauces such as Hollandaise and Alfredo sauces; savory sauces; cultured and non-cultured dairy products such as sour cream, cream cheese, yogurt, cottage cheese dressing, ice cream; whipped applications such as chocolate mousse, toppings and cream fillings; frozen desserts and retorted formulations such as canned soups, among others. The fat-like attributes and stability are achieved without chemical modification of the starch. As a result of these fat-like attributes, food formulations normally containing fat can now be made having reduced levels of fat approaching 100% reduction in certain formulations.

The texturizing agents work particularly well in cultured and processed dairy products to stabilize the food product. Non-fat and reduced fat containing dairy products with excellent organoleptic properties can be formulated. Dairy products, such as cultured sour cream and processed cream cheese spread, containing the texturizing agent, when cold stored refrigerated over a period of time, exhibit excellent stability.

The texturizing agents function to provide structure, opacity, viscosity, stability, and acceptable organoleptic attributes with performance approximating the qualities of the full fat versions when used in reduced fat foods. The texturizing agents lack off-flavors, do not mask the flavors of the foods' inherent flavors when added to a food formulation and have minimal effects on flavor profile. The food formulations containing the texturizing agents of the present invention exhibit excellent freeze/thaw and frozen storage stability, shelf stability and resistance to shear and thermal abuse. The texturizing agents of the present invention have been shown to function well with both laboratory and commercial plant processing schemes and equipment.

The invention is further illustrated by the following examples which are not to be construed as limiting in any way:

EXAMPLE 1

SMALL SCALE PREPARATION OF TEXTURIZING AGENT

METHOD 1: 5% STARCH SOLIDS BATCH

The procedure for producing the texturizing agent using a batch method is described below:

137.5 g of 70% amylose corn starch (AMYLOMAIZE VII®, starch, American Maize, Hammond, Ind.) was weighed into each of two 4 liter beakers. 2740 mL of deionized water was added to each beaker. The final starch solids concentration was 5% (w/v). The beakers were stirred using a Lightnin mixer (Lightnin Mixers, Rochester, N.Y., Model #TS1515) at approximately 250 rpm. The pH of the suspension was checked and adjusted to pH 4.5 with 1M NaOH, if necessary. The suspensions were then combined in a two gallon Parr reactor (Parr Instrument Co., Moline, Ill., Model No. 4552) by transferring through a funnel into the reactor vessel which was stirred at 250 rpm. The batch was then heated to 138° C. After the batch temperature was 138° C. for 60 minutes, a sample was taken for evaluation. A few mLs of the sample were withdrawn through the liquid sampling valve. Using an appropriate microscope at 400-fold magnification, the starch suspension was examined for the presence of remaining starch granules or granule fragments. If the starch granules were completely dissolved, the slurry was discharged from the reactor. If not, a sample was drawn every few minutes for evaluation until remaining starch granules were dissolved. Typical cook time at 138° C. was 100 minutes. The contents of the reactor were discharged into a suitable receptacle. While monitoring the temperature, the slurry was homogenized using a Polytron homogenizer (Brinkmann Instruments, Westbury, N.Y.) outfitted with a PTA20S probe until the temperature of the slurry was 50° C. At this point, the slurry was opaque and white in appearance.

The product of this method was a predominately white gel-like paste which can be used directly in food formulations or can be further concentrated by centrifugation prior to use. This method yielded a product which exhibited a slight degree of mottled brown color and a pronounced rancid off-flavor.

METHOD 2: 10% STARCH SOLIDS BATCH

A texturizing agent of slightly different functionality was prepared using Method 1 of Example 1 with a single change in procedure. The solids concentration of the batch is increased to 10% (w/v). Preparation of the texturizing agent under these conditions yielded a product of higher visual opacity and slightly lower viscosity than the texturizing agent produced at 5% solids in the reactor. Due to the higher concentration of starting material in the reactor vessel, the off-flavor and off-color were even more pronounced than in the batch of Method 1 produced at a lower solids concentration.

METHOD 3: DEFLAVORED, DECOLORED BATCH

A substantially deflavored, decolored texturizing agent was produced by modification of Example 1, Method 2. The reactor vessel was evacuated prior to loading of the starch suspension. The starch suspension was then aspirated into the reactor vessel under vacuum. Prior to heating in the reactor vessel, the slurry was sparged with nitrogen for a period of ten minutes. All subsequent steps in the preparation of the texturizing agent were performed as described in Example 1, Method 1.

Method 3 yielded a texturizing agent that retained the structural and functional characteristics of the texturizing agents prepared by Example 1, Method 2; however, the off-flavor and off-color had been greatly reduced relative to the agents produced from a starch suspension that had not been deaerated, sparged and cooked under inert atmosphere.

METHOD 4: LOW pH BATCH

The preparation of texturizing agent was identical to that described in Example 1, Method 1 except the pH of the starting material had been adjusted to pH 3 with hydrochloric acid. The texturizing agent produced at this lower pH was of much higher opacity and much lower viscosity than those produced at pH 4.5 at 5 or 10% starch solids.

METHOD 5: 50% AMYLOSE STARCH AS STARTING MATERIAL

The texturizing agent was produced as described in Example 1, Method 3, except that the starting material was changed to Amylomaize V. Amylomaize V has an amylose content of about 50% as opposed to the 70% amylose-containing starch used in Methods 1 through 4.

EXAMPLE 2

PREPARATION OF TEXTURIZING AGENT

METHOD 1: Batch Mode 550 g of 70% amylose corn starch (AMYLOMAIZE VII®, American Maize, Hammond, Ind.) was weighed into two 4 liter beakers. 2602 mL of deionized water was added to each beaker. The final starch solids concentration was 11.6% (w/v). The beakers were agitated using a Lightnin mixer (Lightnin Mixers, Rochester, N.Y. Model #TS1515) at approximately 250 rpm. This was sufficient to suspend the starch uniformly. The pH of the suspension was adjusted to 4.5 pH with 1M phosphoric acid. The suspensions were then combined in a two gallon Parr reactor (Parr Instrument Co., Moline, Ill., Model #4552) by syphoning into the vessel. The reaction vessel was stirred at 356 rpm. The starch slurry and reactor was then purged of substantially all oxygen by bubbling nitrogen through a dip tube. Measured oxygen content in the exiting gas was 47 ppm. The reactor was then sealed and heated to 138° C. After the batch temperature was held at 138° C. for 30 minutes, a sample was taken to check the progress of the starch granule dissolution. A few milliliters of the sample were withdrawn through a liquid sampling valve. Using a microscope at 400-fold magnification, the starch suspension was examined for the presence of remaining starch granules or granule fragments. The starch granules were essentially dissolved and the slurry was cooled to less than 100° C. by passing cooling water through an internal coil.

The starch slurry cooled to 95° C. was passed through a 10 micron filter (Grade A10, Alsop Engineers, Kingston, N.Y.) to remove undissolved impurities. The filter holder and media were pre-heated with hot water prior to starch slurry filtration. This was done to prevent pre-mature retrogradation of the starch on the filter media and consequent blinding of the filter. Filtered starch slurry was collected in a metal beaker.

The filtered starch slurry was processed through a twostaged hemogenizer (APV-Gaulin Model #15MR-STBA, Wilmington, Mass.). The homogenization pressure was set at 3000 psig. At this point the slurry was opaque and white in appearance. The homogenate was then allowed to cool overnight inside a cold room regulated at 4° C. The product at this point is a white stiff gel which can be used directly in food formulations or can be dried to a powder using various drying techniques. In particular, spray drying of the gel produces a free-flowing powder that is readily hydrated in water.

The starch paste was too stiff for direct feeding to a spray dryer. It had to be sheared into a more flowable form. It was diluted to approximately 7% (w/w) solids using deionized water. This was fed to a spray dryer (Niro Model #1291, Columbia, Md.) which was fitted with a centrifugal atomizer. Inlet air temperature was regulated to maintain outlet air temperature at 100° C.

Method 2: Batch Mode; Use of An Excipient

A 700 gal stainless steel tank was charged with 624 gallons of softened water heated to 110° F. Under moderate agitation, 700 pounds of 70% amylose starch (AMYLO-MAIZE VII®, American Maize, Hammond, Ind.) was carefully added to the water. The final starch solids concentration was 10.7% (w/v). The pH of the starch slurry was adjusted to 4.5 pH with 75% (w/w) phosphoric acid. The starch slurry was transferred to an 800 gallon pressure reactor (Northland Stainless) which was mixed with a dual impeller agitator (Lightnin Mixers, Model #XJC65, Rochester N.Y.). The reactor was sealed. Oxygen was purged from the reactor and starch slurry by repeated evacuations of the head space and sparging the liquid phase with nitrogen. Vacuum was pulled to a minimum of 25 inches Hg. Nitrogen was sparged into the vessel through a dip tube into the liquid phase. The nitrogen was sparged until the vessel pressure reached 2 inches Hg vacuum. This process was repeated until oxygen content in the liquid phase was less than 0.8 ppm. The vessel was then evacuated an additional time. The reactor temperature was raised to 138° C. as quickly as possible. After the batch temperature was held at 138° C. for 15 minutes, a sample was taken to check the progress of the starch granule dissolution as described in Method 1. Starch dissolution typically occurred 30 minutes after reaching 138° C. When the starch granules were essentially dissolved, the slurry was cooled to about 88° C. by passing cooling water through the reactor heating jacket.

A 24-inch square plate and frame filter press was fitted with 10 micron filter pads (Grade A10, Alsop Engineering, Kingston, N.Y.). Eleven or twelve frames were used to filter a batch. The press and filter media were preheated with softened water until the outlet temperature was greater than 77° C. The starch slurry was then pumped through the press. The filtered starch slurry was collected in a 700 gallon jacketed agitated vessel (Cherry Burrell, Louisville, Ky.). The filtrate was maintained at about 82° C.

An excipient was added to the starch slurry at this point. To the starch slurry, 210 pounds of 5 DE maltodextrin (LoDex 5, American Maize, Hammond, Ind.) was added and stirred until dissolved. The starch slurry was processed through a single stage homogenizer operating at 3000 psig (APV-Gaulin, Model #250-M6-8TBS, Wilmington, Mass.). Homogenate was collected in drums which were stored in a cold room to complete the retrogradation process. The cold room temperature was regulated at 4° C.

The product at this point was a stiff white gel-like paste. It was diluted with 1 part water to 3 parts paste and mixed in a 300 gallon jacketed mixer (Groen Model #DV/TA-400, Elk Grove Village, Ill.). The additional water and mixing transformed the paste into a flowable, pumpable fluid that was fed to a spray dryer. The spray dryer was operated at an outlet temperature of about 104° C. High pressure nozzles (Nozzle #58, Core #21; Spraying Systems Co., Wheaton, Ill.) were used to atomize the product. The product was a free-flowing white powder.

Method 3: Batch Mode Using Filter Aid And Excipient

A stainless steel reactor was charged with 75 gallons of reverse osmosis water. Under moderate agitation, 34.1 kg of 70% amylose starch (AMYLOMAIZE VII®, American Maize, Hammond, Ind.) was added. The pH of the starch slurry was adjusted to 4.5 using 0.6N phosphoric acid. The reactor was sealed. Oxygen was purged from the reactor and starch slurry by repeated evacuations of the head space and sparging the liquid phase with nitrogen. Vacuum was pulled to a minimum of 25 inches Hg. Nitrogen was sparged into the vessel through a dip tube into the liquid phase. The nitrogen was sparged until the vessel pressure reached 2 inches Hg vacuum. This process was repeated for a total of eight times. At the end of this program, the oxygen content in the liquid phase was less than 1.0 ppm. Under agitation, the vessel contents were heated to 138° C. After the batch temperature was held at 138° C. for 30 minutes, a sample was taken to check the progress of the starch granule dissolution as described in Method 1. Starch dissolution typically occurred 45 minutes after reaching 138° C. When the starch granules were essentially dissolved, the slurry was cooled to about 95° C. by passing cooling water through the reactor jacket. The reactor was then depressurized and unsealed. A filter aid (Celite Hyflo, Celite Corp., Lompoc, Calif.) was added to the hot starch slurry. As much as 9.6 kg of Celite was added to ensure smooth filtration. A 1 foot square plate and frame press was prepared with coarse papers and cloths. Ten frames were used to process one batch. The press was preheated with hot water to minimize starch retrogradation on the filter media. The starch slurry was recirculated through the press and returned to the reaction vessel until the filtrate was clear of filter aid. At that point, the filtrate was collected in an agitated, jacketed vessel.

To the filtrate, 10.2 kg of 5 DE maltodextrin (Maltrin M040, Grain Processing Co., Muscatine, Iowa) was added and agitated until completely dispersed. The starch solution was processed through a two-staged homogenizer (APV-Gaulin, Model #15NR-8TBA, Wilmington, Mass.). The homogenizer was operated at 3000 psig. The homogenate was collected in pails. The retrogradation process was continued overnight in a cold room which was maintained at 4° C.

Method 4:

A homogenized starch slurry was prepared as described in Method 3. The output from the homogenizer was fed to a belt flaker (Sandrik, Tolowa, N.J.). The belt 20 inch by 12 foot flaker was cooled with water sprays of 10° C. The residence time ( ca. 2 minutes) on the belt was adjusted to produce a set gel on the discharge end. The product temperature leaving the belt flaker was about 12° C. This material was collected into pails and stored in a cold room to complete the retrogradation process. The cold room was regulated at 4° C.

EXAMPLE 3

LIPID CONTENT DETERMINATION

Due to the likelihood that the off-flavors and off-colors observed in the texturizing agent prepared in Example 1, Methods 1 and 2 were produced via lipid oxidation or degradation, the starting material, AMYLOMAIZE VII® (American Maize, Hammond, Ind.) was analyzed for lipid content in the following manner: 50 g of AMYLOMAIZE VII were dispersed in 200 mL of 2% sulfuric acid (w/v). The suspension was heated 70° C. for 7 hours with stirring followed by slow cooling to room temperature and overnight incubation. A white slurry was observed at this point due to unhydrolyzed starch, therefore, the slurry was transferred to a 500 mL round bottom flask and the slurry was heated and refluxed for 4 to 5 hours. At this point a brown solution was obtained. The solution was allowed to cool and stand at room temperature overnight and was then neutralized with 2N NaOH (approximately 77 mL). The solution was transferred quantitatively into a 1 L separatory funnel and extracted with 300 mL of hexane. The extraction was repeated 3 more times and the hexane extracts were combined and dried by passing over sodium sulfate. The hexane extract was evaporated to dryness leaving a fat-like residue. The residue was further air-dried overnight. The weight of the hexane extract was 0.35 g indicating a lipid content of at least 0.7% (w/v) in the Amylomaize starting material.

EXAMPLE 4

DETERMINATION OF RESISTANCE TO ENZYME DIGESTION

The purpose of this experiment was twofold: to determine the resistance to enzyme digestion of the texturizing agent prepared according to the method of Example 1, Method 2 as well as assess degradation of the starch polymer, if any, during processing. The resistance to enzyme digestion is an indication of the degree of retrogradation (crystallinity) within the starch polymer.

The content of reducing sugars of each sample was determined using the Somogyi-Nelson Colorimetric Assay. [Somogyi-Nelson, M. (1945) *J. Biol Chem. Vol.* 160:61–68] For each sample to be analyzed, 25 mg of starch solids was weighed into a tared test tube to which 1.88 mL of sodium acetate buffer (pH 4.7) was added. The samples were then centrifuged at 3,000 rpm for 5 minutes in a benchtop centrifuge (Damon, Needham Heights, Mass. Model IEC- 7R). Immediately following centrifugation, a 10 mL aliquot of each sample was removed and diluted to 0.5 mL with distilled water and assayed for the determination of reducing sugars prior to enzyme digestion.

To determine the reducing sugar content subsequent to enzyme treatment, an aliquot (60 μL) of glucoamylase (Diazyme L-200, Solvay Enzymes, Inc., Elkhart, Ind.) and an aliquot (60 μL) of α-amylase (Clarase L-40,000, Solvay Enzymes, Inc., Elkhart, Ind.) were added to the samples. The samples were then mixed on a Vortex mixer (Scientific Industries, Bohemia, N.Y.) for a few seconds. The remainder of the samples were then placed in an incubator-shaker (Lab-Line, Melrose Park, Ill., Model #3526) thermostatted to 50° C. with shaking set at 200 to 250 rpm. To follow rate and/or extent of reaction, 10 μL aliquots were removed and diluted to 0.5 ml with distilled water and assayed as a function of time for up to 24 hours. The samples were centrifuged as described above prior to each removal of the 10 μL sample to precipitate any undigested starch that may be present in the sample. Appropriate solvent blanks were prepared according to the preceding protocol.

The results are presented in Table 1 below:

TABLE 1

|  | Reducing Sugar Content (% w/w) |
| --- | --- |
| Starting Material (AMYLOMAIZE VII) | <1 |
| Texturizing Agent prior to enzyme digestion | <1 |
| Texturizing Agent after 5 hours of enzyme digestion | 85 ± 3 |
| Texturizing Agent after 24 hours of enzyme digestion | 98 ± 10 |

The lack of reducing sugars in the texturizing agent, above background, prior to enzymatic hydrolysis indicated that little, if any, degradation of the starch polymer occurred during processing of the high amylose starch into the texturizing agent. The susceptibility of the texturizing agent to complete enzyme hydrolysis following 24 hours of incubation indicated the absence of crystalline regions within the starch matrix.

EXAMPLE 5

DIFFERENTIAL SCANNING CALORIMETRY ANALYSIS OF THE TEXTURING AGENT

Figure 2:
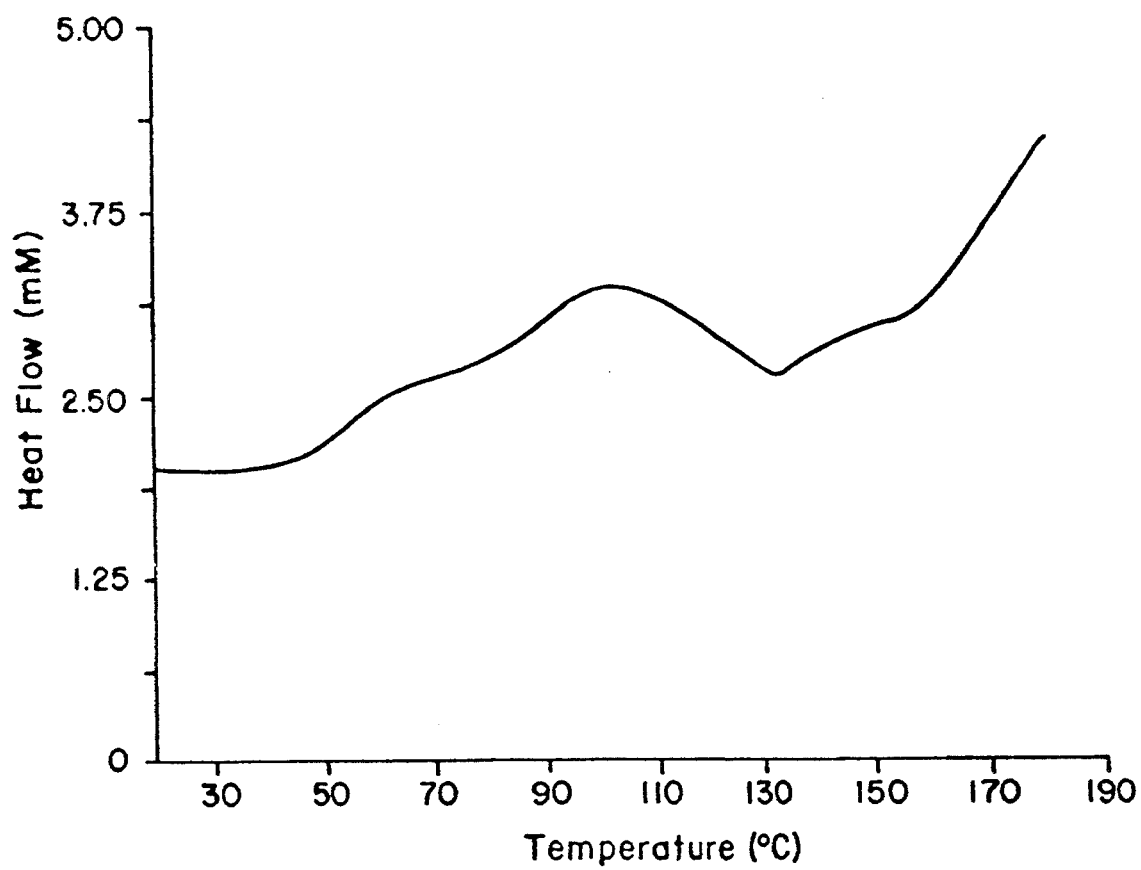
FIG. 2 is a differential scanning calorimetry (DSC) thermogram depicting the structure of a texturizing agent of this invention.

The presence of crystalline starch regions within the polymeric structure of the texturizing agents was examined by differential scanning calorimetry (DSC) using a Perkin-Elmer Differential Scanning Calorimeter Series DSC7, sample pans, and sealing tools (Perkin Elmer, Norwalk, Conn.). The sample for analysis was prepared by weighing 20 mg of dry solids into a steel DSC pan to which 40 μL of water was then added. The pan was then sealed with a lid and o-ring. The sample was incubated overnight at room temperature to equilibrate. After initial cooling, the temperature of the sample pan was increased from i° C to 180° C. at a rate of 7° C. per minute. Baselines were preset using empty steel pans on the sample and reference holders and the instrument was calibrated against zinc and indium standards. Typical results for DSC analysis of texturizing agents prepared according to Example 1, Methods 1 or 2 are depicted in FIG. 2. The absence of any significant thermal transition in the region of 155° C. indicated the absence of crystallinity in the starch polymer. Therefore, the texturizing agent prepared according to the methods of this invention is retrograded and non-crystalline in structure.

EXAMPLE 6

BAKED CHEESECAKE

METHOD 1: SMALL SCALE BATCH (500 g)

A reduced fat, reduced calorie baked cheesecake containing less than 0.8% total fat was prepared from the texturizing agent prepared in Example 1, Method 3 using the following formula:

| Ingredient | Weight Percentage |
| --- | --- |
| Water | 44 |
| Baker's Cheese | 27 |
| Sugar | 15.6 |
| Maltodextrin (DE = 10) | 5.2 |
| Nonfat Dry Milk | 3.48 |
| Egg white solids | 2.0 |
| Texturizing agent (dsb) | 1.0 |
| Vanilla | 0.73 |
| Butter base flavor | 0.31 |
| Carrageenan | 0.20 |
| Lecithin | 0.20 |
| Salt | 0.10 |
| Xanthan Gum | 0.05 |

The ingredients were processed as follows: A prehydrate blend was prepared with the xanthan gum, texturizing agent and water. Using a kitchen blender (Oster/Sunbeam Appliance Co., Memphis, Tenn., Model: OSTERIZER™ 10 speed) at high speed, slowly add xanthan gum and a portion of the sugar. The gum was blended for 7 minutes. The texturizing agent was added slowly to the xanthan slurry and blended at high speed for 15 minutes. The blend was then allowed to sit for at least one hour at 40° F.

In a separate container, the remaining dry ingredients were mixed. In another container the cheese and flavors were also combined. The cheese/flavors mixture was blended (Kitchen Aid, St. Joseph, Mich., Model KSM 90) slowly for 2 minutes stopping at the half way point to scrape down the sides of the bowl with a spatula. The dry blend was then added and mixed for about 2 minutes at slow speed to disperse, again stopping after about one minute to scrape the sides of the bowl. Approximately one-half of the xanthan gum/texturizing slurry was added and blended for about 30 seconds. The remainder of the xanthan gum/texturizing agent mixture was then added. The combined ingredients were then mixed for an additional five minutes, scraping the sides of the bowl often with a spatula.

Aluminum pans (6.5 inch diameter) were prepared by greasing the bottoms and layering with from 8 to 10 g of finely milled crust crumbs (A&D Ingredients, Co., East Brunswick, N.J.). The pans were filled by hand with finished batter (~500 g/pan) and the cheesecakes were baked at 350° F. (177° C.) for about one hour or until lightly golden brown. The cheesecakes were then cooled to room temperature for approximately 2 hours and placed in a freezer for storage. The cheesecakes prepared by this method have a fat content of <0.8% (due to the small amount of fat introduced by the use of baker's cheese, lecithin and flavor) as compared to 23% or higher fat in the typical full-fat cheesecake for a reduction in fat content of approximately 99% and a caloric reduction of 62%. From a sensory standpoint, the cheesecakes were of high quality and exhibited good mouthfeel and viscosity, no syneresis, good freeze/thaw stability, and flavor.

METHOD 2: PLANT SCALE BATCH (60 POUNDS)

Baked cheesecake was prepared using the same formulation (on a weight percentage basis) and essentially the same procedure as presented in Example 2, Method 1, but on a large scale. Blending of ingredients was achieved using a plant scale mixer (Hobart Corp., Troy, Ohio) followed by baking in an industrial gas-fired, rotating oven. The large scale processing under plant conditions resulted in cheesecakes of improved quality relative to those produced on the small scale as described in the previous method.

EXAMPLE 7

NO-BAKE CHEESECAKE

A reduced fat, reduced calorie no-bake cheesecake containing less than 1.8% total fat was prepared from the texturizing agent prepared by the method of Example 1, Method 3 using the following formula:

| Ingredients | Weight Percentage |
| --- | --- |
| Water | 40 |
| Baker's cheese | 29.2 |
| Sugar | 15.0 |
| Neufchatel cheese | 6.4 |
| Non-fat milk solids | 3.35 |
| Egg white solids | 2.0 |
| Texturizing agent (dsb) | 1.0 |
| Gelatin (Bloom 225) | 1.0 |
| Vanilla | 0.7 |
| Lecithin | 0.2 |
| Salt | 0.1 |
| Xanthan gum | 0.05 |

The ingredients were processed in the following manner: the gelatin was heated with approximately 25% of the make-up water to 160° F. (71° C.) and allowed to cool to 140° F. (60° C.). In a separate container, the xanthan gum was blended with approximately 25% of the water and mixed for 10 minutes using a Virtis mixer (The Virtis Company, Inc., Gardner, N.Y., Item #176057). The remaining water was blended with the texturizing agent and mixed for 10 minutes using the Virtis mixer. The xanthan/water and texturizing agent/water blends were then combined and mixed for an additional 5 minutes.

Using a kitchen blender (Kitchen Aid, St. Joseph, Mich.), the cheeses were blended. The dry ingredients and vanilla were then added and mixed for 3 to 5 minutes until uniformly dispersed. The texturizing agent/xanthan gum/water blend was then added and the combined ingredients were mixed for 1 minute at speed 2. The hot gelatin (140° F.; 60° C.) was then mixed into the batter for 1 minute at speed 2. The batter was transferred to plastic dishes (3.75×3.75 in) which had been previously lined on the bottom with 1.5 to 2 g of graham cracker crumbs. The cakes were then placed in a 4° C. refrigerator, allowed to set, and subsequently stored in a −20° C. freezer until thawed and consumed.

The resultant no-bake cheesecake had a fat content of 2.6% and exhibited good mouthfeel and flavor.

EXAMPLE 8

CHOCOLATE MOUSSE

METHOD 1: SMALL SCALE BATCH (~1 POUND)

A reduced fat, reduced calorie chocolate mousse containing less than 1.1% total fat was prepared from the texturizing agent prepared in Example 1, Method 3 using the following formula:

| Ingredients | Weight Percentage |
| --- | --- |
| Water | 69.1 |
| Non-fat Dry Milk Solids | 11.5 |
| Sugar | 11.5 |
| Cocoa Powder | 3.8 |
| Stabilizer Mix* | 2.8 |
| Texturizing agent | 1.25 |
| Vanilla Extract | 0.1 |

*Stabilizer Mix: Cremodan Mousse Mix, Grinsted, Industrial Airport, KS

The texturizing agent was blended with the water until well dispersed. The dry ingredients were combined and then added to the texturizing agent/water mixture in a kitchen blender. The combined ingredients were blended until uniformly dispersed. The mixture was then heated to 180° F. (54° C.) and held for 30 seconds at that temperature. The heated mixture was then homogenized using a Polytron Homogenizer Model PT10/35 fitted with a PT20S generator (Brinkmann Instruments, Westbury, N.Y.) at 16,000 rpm for one minute. The mixture was then cooled to 100° F. (38° C.) on ice while continuing to homogenize at 10,000 rpm. The homogenate was further cooled to 40° F. (4° C.), then whipped for five minutes at high speed using a Kitchen Aid mixer (Kitchen Aid, St. Joseph, Mich.). Overrun was typically in the range of 80 to 160%.

The low amount of fat in the resultant mousse (4.1%) was contributed by that present in the cocoa powder and stabilizer mix. The fat-reduced mousse was evaluated and found to have acceptable organoleptic properties. The texturizing agent was found to contribute significantly to foam formation, foam stability, smoothness and viscosity, as compared to a negative control. No off-flavors were detectable and the mousse exhibited no unpleasant aftertaste. Based on a comparison with the typical 10% fat control, the fat and caloric contents have been reduced by 90 and 46%, respectively.

METHOD 2: PILOT SCALE BATCH (120 POUNDS)

Chocolate mousse was prepared using the same formulation and essentially the same procedure as presented in Example 3, Method 1 but on a larger scale. Blending of ingredients was performed using a Norman mixer followed by homogenization with a Gaulin two-stage homogenizer (APV Gaulin, Chelsea, Mass.). The homogenate was processed using a continuous whipper. By varying the product temperature and nitrogen incorporation, the degree of overrun was controlled. Specifically, overrun values of 30, 60 and 142% were achieved. The mousse produced on a large scale was of similar organoleptic quality as that produced in Example 4, Method 1.

EXAMPLE 9

REDUCED-FAT SAUCES

METHOD 1: REDUCED FAT ALFREDO SAUCE

A reduced fat, reduced calorie Alfredo sauce containing less than 13% total fat was prepared from the texturizing agent produced in Example 1, Method 3 using the following formula:

| Ingredients | Weight Percentage |
| --- | --- |
| Skim milk | 51.6 |
| Grated Parmesan cheese | 27 |
| Water | 10.9 |
| Sweet butter | 8.0 |
| Texturizing agent | 2.3 |
| Xanthan gum | 0.2 |

The texturizing agent and xanthan gum were mixed with the skim milk in a kitchen blender at 90° C. (Kitchen Aid, St. Joseph, Mich.) until uniformly dispersed. The agent mixture was mixed for an additional two minutes at high speed and mixed for an additional three minutes. The butter was then blended in at high speed. The entire mixture was transferred to a heating vessel and slowly brought to a simmer (150° to 160° F.; 68° C.) Grated Parmesan cheese was then added slowly to the blend while mixing with a whisk. The finished sauce was then pasturized at 83° C. for 30 seconds before freezing.

The sauce produced by this method was of very high quality, had excellent taste, mouthfeel, appearance, viscosity, and freeze/thaw stability. The fat content of the final product (15%) represented a 60% percent reduction from the fat content of a typical full-fat Alfredo sauce (38%). The caloric reduction was 48%.

METHOD 2: REDUCED-FAT BUTTER SAUCE

A reduced-fat, reduced-calorie butter sauce containing 1% total fat was prepared from the texturizing agent prepared in Example 1, Method 3 using the following formula:

| Ingredients | Weight Percentage |
| --- | --- |
| Water | 95.8 |
| Texturizing agent (dsb) | 2.0 |
| Salt | 1.0 |
| Butter base 20* | 1.0 |
| Xanthan Gum | 0.2 |

*Butter base 20 (Cumberland Packaging Company, Racine, WI)

The ingredients were combined in a kitchen blender (Oster/Sunbeam Appliance Co., Memphis, Tenn.) and blended at high speed for 2 minutes. The blend was transferred to a glass container and heated in a microwave oven (General Electric Co., Louisville, Ky., Spacemaker Model set at power level 10) for 22 seconds. After heating, the sauce was stirred by hand.

The texturizing agent provided body, viscosity and opacity to the reduced-fat sauce.

EXAMPLE 10

METHOD 1: FAT-FREE MAYONNAISE

A reduced fat, reduced calorie mayonnaise was prepared from the texturizing agent produced by the method described in Example 1, Method 1 using the following formula:

| Ingredients | Weight Percentage |
| --- | --- |
| Water | 83.6 |
| Texturizing Agent | 5.67 |
| Vinegar | 7.0 |
| Xanthan gum | 0.1 |
| β-carotene | 0.007 |

| Ingredients | Weight Percentage |
| --- | --- |
| Salt | 1.8 |
| Sugar | 2.75 |
| EDTA | 0.0075 |
| Potassium sorbate | 0.1 |
| Potassium benzoate | 0.1 |

The β-carotene, texturizing agent, and approximately half of the water was blended using a Kitchen Aid blender (Kitchen Aid, St. Joseph, Mich., Model K45SS) at speed 2 for 5 minutes. The xanthan gum, vinegar and remaining water were simultaneously blended for 5 minutes at half speed using a Virtis mixer (The Virtis Company, Inc., Gardner, N.Y., Item #176057). The two mixtures were combined in the Kitchen Aid blender and mixed for an additional 5 minutes at speed 2. The mixture was then passed through a colloid mill (Premier Mill Corp., Temple, Pa., Model KCD). The resultant mayonnaise is then deaerated in a Power Mixer with Vacuum (Whip Mix Corp., Louisville, Ky.).

This formulation and process yielded a mayonnaise with good opacity, acceptable mouthfeel and viscosity, and good storage stability; however, due to the greater percent incorporation of texturizing agent, the off-flavors inherent in the product of Example 1, Method 1, were detectable in the formulated mayonnaise. A 100% reduction in fat content was achieved relative to a typical 80% full fat mayonnaise with a caloric reduction of 90%.

METHOD 2: FAT-FREE MAYONNAISE OF REDUCED OFF-FLAVOR

Mayonnaise was prepared as in Example 9, Method 1 except using texturizing agent produced as described in Example 1, Method 3. The mayonnaise produced with this texturizing agent had improved flavor attributes relative to mayonnaises prepared using texturizing agents prepared as described in Example 1, Method 1.

METHOD 3: REDUCED FAT (3%) MAYONNAISE

Mayonnaise was prepared as in Example 9, Method 2 except soybean oil was added to a level of 3% by weight to the formulation. The 3% oil mayonnaise exhibited smoother mouthfeel, improved lubricity and increased opacity.

METHOD 4: REDUCED-FAT (10%) MAYONNAISE

Mayonnaise was prepared as in Example 9, Method 2 except soybean oil was added to a level of 10% by weight to the formulation. The 10% oil mayonnaise exhibited further improvement in mouthfeel, lubricity, and opacity relative to the 3% oil mayonnaise prepared in the previous example.

METHOD 5: REDUCED-FAT MAYONNAISE WITH ADDED EGGS

The 0, 3 and 10% oil mayonnaises were prepared as in Example 9, Methods 2, 3 and 4, except liquid egg yolk was added to the formulation at a level of 5.8% by weight. In all cases, the overall appearance and organoleptic qualities of the reduced-fat mayos were enhanced especially regarding increased opacity and flavor.

EXAMPLE 11

FAT FREE SALAD DRESSING

METHOD 1: CREAMY ITALIAN SALAD DRESSING

A fat-free, reduced calorie Creamy Italian salad dressing was prepared from the texturizing agent produced by the method described in Example 1, Method 2 using the following formula:

| Ingredients | Weight Percentage |
| --- | --- |
| Skim milk | 39.1 |
| Water | 31.0 |
| Vinegar (50 grain) | 20.0 |
| Sugar | 3.8 |
| Texturizing agent | 3.0 |
| Salt | 2.0 |
| Garlic powder | 0.3 |
| Red pepper pieces (8 + 40) | 0.3 |
| Onion powder | 0.15 |
| Xanthan gum | 0.1 |
| Potassium sorbate | 0.1 |
| Sodium benzoate | 0.1 |
| Oregano flakes | 0.03 |
| Calcium disodium EDTA | 0.0075 |

The ingredients were processed in the following manner: The xanthan gum and water were mixed for 10 minutes using a Lightnin mixer (Lightnin Mixers, Rochester, N.Y.) at speed 3. The remaining dry ingredients, except the red pepper and oregano, were then added and mixed for an additional 5 minutes. The texturizing agent was blended in at speed 6 and the blend was mixed for 5 minutes. The mixture was then passed through a colloid mill (Premier Mill Corp., Temple, Pa., Model KCD). The resultant salad dressing was then deaerated in a Power Mixer with Vacuum (Whip Mix Corp., Louisville, Ky.). As a final step, the red pepper and oregano were mixed in by hand.

The fat-free Creamy Italian salad dressing produced by this method exhibited good opacity and viscosity, as well as acceptable flavor and mouthfeel.

METHOD 2: THOUSAND ISLAND SALAD DRESSING

A fat-free, reduced calorie Thousand Island salad dressing was prepared from the texturizing agent produced by the method described in Example 1, Method 3 using the following formula:

| Ingredients | Weight Percentage |
| --- | --- |
| Water | 44.0 |
| Skim milk | 20.0 |
| Sugar | 12.5 |
| Vinegar (100 grain) | 8.0 |
| Vinegar (red wine) | 5.0 |
| Tomato paste | 3.5 |
| Texturizing agent | 3.0 |
| Egg yolk | 2.5 |
| Salt | 1.8 |
| Lemon juice | 0.5 |
| Xanthan gum | 0.15 |

The milk, water, egg yolks and xanthan gum were combined and mixed for 10 minutes using a Virtis mixer at speed 5 (The Virtis Company, Inc., Gardner, N.Y., Item #176057). In a separate container, the remaining ingredients were combined and blended for 5 minutes in a kitchen blender (Kitchen Aid, St. Joseph, Mich., Model K45SS) at speed 2. The mixture was then passed through a colloid mill (Premier Mill Corp., Temple, Pa., Model KCD). The resultant salad dressing was then deaerated in a Power Mixer with Vacuum (Whip Mix Corp., Louisville, Ky.). As a final step, the red pepper and oregano were mixed in by hand.

The fat-free Thousand Island salad dressing produced by this method exhibited good opacity and viscosity as well as acceptable flavor and mouthfeel.

EXAMPLE 12

REDUCED-FAT SPREAD

A reduced fat, reduced calorie margarine-type spread containing approximately 20% total fat was prepared from the texturizing agent prepared in Example 2, Method 3 using the following formula:

| Ingredients | Weight Percentage |
| --- | --- |
| Water | 74.74 |
| Soy bean oil | 15 |
| Soy bean flake | 5.0 |
| Texturizing agent | 3.2 |
| Salt | 1.2 |
| Monoglyceride (Dimodan LSK) | 0.65 |
| Sodium benzoate | 0.1 |
| Potassium sorbate | 0.0075 |

The spread was prepared by combining the texturizing agent, water, salt, sodium benzoate, potassium sorbate, and EDTA and heating to 180° F. (82.2° C.). The remaining ingredients were combined in a separate container and heated to approximately 125° F. (52° C.). The two mixtures were combined, stirred and allowed to cool to 90° F. (32.2° C.). The solution was then transferred to a blender and mixed at high speed for 60 seconds. The solution was then transferred to a suitable container which was placed in an ice bath and stirred until the emulsion was set up.

The resulting spread was 75% fat-reduced relative to an 80% full fat control. The spread exhibited excellent melting characteristics in a frying pan, especially in regards to lack of spattering. The spread melted well on toast, had excellent mouthfeel, smoothness and acceptable stability.

EXAMPLE 13

Low-fat Chocolate Frosting

A reduced fat, reduced calorie chocolate frosting containing 2% fat was prepared from the texturizing agent using the following formula:

| Ingredients | Weight Percentage |
| --- | --- |
| Starch product (Example 2, Method 3) | 4.30 |
| Bottled Watter | 24.60 |
| Corn Syrup Solids (GPC Maltrin M200) | 18.00 |
| Emulsifier | 1.00 |
| Shortening (Van Den Bergh's Creamtex ®) | 1.00 |
| Powdered Sugar (10X) | 43.10 |
| Cocoa Powder (DeZaan Defatted Type S) | 6.00 |
| Caramel Color (Williamson #604) | 1.50 |
| Salt (Retail Grade) | 0.50 |
|  | 100.00 |

The texturizing agent was processed with standard kitchen equipment as follows:

1. Weigh the starch product and corn syrup solids into 2 separate containers and set aside.
2. Dry blend the remaining dry ingredients and set aside.
3. Add boiling water to a mini-food processor (Sunbean Oskar Jr., Chopper Plus). Slowly add the starch product while shearing. Once dispersed, shear for an additional 10 seconds.

4. Add corn syrup solids and shear for 2 minutes to disperse. Scrape the sides of the mini-food processor as needed.
5. Combine the emulsifier and shortening. Heat until melted. Add to the above mixture while shearing for another 2 minutes.
6. Transfer the contents of the mini-food processor to the bowl of a kitchen aide mixer, equipped with the paddle attachment.
7. Add the dry blend. Mix on speed 1 for 1 minute. Increase to speed 10 and mix for 5 minutes. Scrape the sides of the mixer as needed.

The frosting produced by this method was of very high quality and had excellent texture, appearance and peaking characteristics. Comparison against a maltodextrin solids control verified the unique fat-like and bulking characteristics of the texturizing agent.

Oven-baked cakes were frosted and tested for slippage of the frosting during accelerated storage (24 hours at 100° F., 60% relative humidity). The frosting prepared with this ingredient showed virtually no slippage while commercially made low and full-fat frostings showed appreciable slippage from the cakes.

EXAMPLE 14

No-fat Sour Cream

A no-fat sour cream was prepared from the texturizing agent using the following formulation:

| Ingredients | Weight Percentage |
| --- | --- |
| Skim Milk | 96.10 |
| Starch product (Example 2, Method 3) | 3.50 |
| Non-fat Dry Milk | 0.40 |
| | 100.00 |

The sour cream mix was prepared and processed in the following manner:
1. Weigh accurately the wet ingredients and dry ingredients separately.
2. Heat the wet ingredients in a batch pasteurizer to 110° F. and add the mixture of dry ingredients with continuous high speed mixing using Lightening mixer.
3. Raise the temperature to 190° F. and hold for about 5 minutes, followed by homogenization at 2000 psi (1st stage) and 500 psi (2nd stage) pressures using a Gualin homogenizer.
4. The samples are heated again to 175° F. to re-pasteurize and immediately cooled to 78° F. before inoculation with sour cream starter culture.
5. After inoculation samples are incubated at 78° F. for 18 to 20 hours followed by cooling at 40° F. for 16 to 18 hours.

The texturizing agent processed with this method will produce an excellent quality no fat sour cream which have sensory attributes, stability, set and opacity characteristics superior to existing commercial products. The product can be made easily with existing sour cream production equipment and the ingredient statement is clean.

EXAMPLE 15

Half-fat Peanut Butter Spread

A half-fat peanut butter spread was prepared from the texturizing agent using the following formulation:

| Ingredients | Weight Percentage |
| --- | --- |
| Peanut Butter | 50.00 |
| Starch product (Example 2, Method 3) | 2.00 |
| Bottled Water | 48.00 |
| | 100.00 |

The spread was prepared and processed in the following manner:
1. Heat the water to 100° C. and place in a standard kitchen blender jar.
2. Slowly add the texturizing agent while mixing on high speed. Once dispersed, mix for five minutes.
3. Immediately transfer the paste into a bowl of a small mini-food processor (Sunbean Oskar Jr., CHOPPER PLUS®); add peanut butter and mix until uniformly blended (about 3 minutes).

The texturizing agent processed with this method will produce an excellent quality half-fat peanut butter spread which has sensory and stability attributes that are similar to full-fat peanut butter. The product can be made easily with existing commercial equipment and the ingredient statement is clean.

Equivalents

Those skilled in the art will recognize, or be able to ascertain using no more than routine experimentation, many equivalents to the specific embodiments of the invention described herein. Such equivalents are intended to be encompassed by the following claims:

We claim:

1. A method for preparing a starch-based texturizing agent, comprising the steps of:
   a) heating a slurry of high amylose starch in an acidic aqueous medium having a pH of from about 3.0 to about 4.7 under agitating conditions for a temperature, pressure and time sufficient to substantially disrupt starch granules, to produce a solubilized starch solution;
   b) filtering the resultant solution to remove impurities; and
   c) reducing the temperature of the resultant solution to a temperature and for a period of time sufficient for the starch to retrograde, wherein the starch is essentially devoid of starch granules.

2. The method of claim 1 wherein the high amylose starch is derived from corn, barley or pea.

3. The method of claim 1 wherein the slurry comprises from about 1 to about 30% (w/v) high amylose starch.

4. The method of claim 3 wherein the slurry contains from about 5 to about 15% (w/v) high amylose starch.

5. The method of claim 1 wherein step (a) is performed at a final temperature from about 125° C. to about 150° C.

6. The method of claim 5 wherein the slurry is heated to a final temperature of about 138° C. and held for from about 1 to about 120 minutes.

7. The method of claim 1 wherein the pH is from about 4.3 to about 4.7.

8. The method of claim 1 wherein in step (c) the temperature of the solution is reduced to about 4° C.

9. The method of claim 1 further comprising the step of drying the texturizing agent into a powder.

10. The method of claim 9 wherein the texturizing agent is dried by spray drying.

11. The method of claim 1 wherein an excipient is added prior to or after the filtration step.

12. The method of claim 11 wherein the excipient is selected from the group consisting of gums, sugars, proteins, lipids, flavors, colors and starches.

13. The method of claim 12 wherein the excipient is maltodextrin.

14. The method of claim 1 further comprising after step (b) the step of subjecting the filtered solution to high shear.

15. The method of claim 1 wherein step (a) is performed by jet cooking.

16. A method for preparing a starch-based texturizing agent, comprising the steps of:
   a) heating a slurry of high amylose starch in an acidic aqueous medium having a pH from about 3.0 to about 4.7 under agitating conditions for a temperature, pressure and time sufficient to substantially disrupt starch granules, to produce a solubilized starch solution;
   b) filtering the resultant solution to remove impurities;
   c) adding an excipient to the solution; and
   d) reducing the temperature of the resultant solution to a temperature and for a period of time sufficient for the starch to retrograde wherein the starch is essentially devoid of starch granules.

17. The method of claim 16 wherein step (a) is performed at a final temperature from about 125° C. to about 150° C.

18. The method of claim 16 wherein the slurry has a pH of from about 4.3 to about 4.7.

19. The method of claim 16 further comprising the step of drying the texturizing agent into a powder.

20. The method of claim 19 wherein the texturizing agent is dried by spray drying.

21. The method of claim 16 wherein step (a) is performed by jet cooking.

22. The method of claim 16 wherein the excipient is maltodextrin.

23. A method for preparing a starch-based texturizing agent, comprising the steps of:
   a) heating a slurry of high amylose starch in an acidic aqueous medium having a pH of from about 3.0 to about 4.7 under agitating conditions for a temperature, pressure and time sufficient to substantially disrupt starch granules, to produce a solubilized starch solution;
   b) adding an excipient to the solution;
   c) filtering the resultant solution to remove impurities; and
   d) reducing the temperature of the resultant solution to a temperature and for a period of time sufficient for the starch to retrograde wherein the starch is essentially devoid of starch granules.

24. The method of claim 23 wherein step (a) is performed at a final temperature from about 125° C. to about 150° C.

25. The method of claim 23 wherein the slurry has a pH of from about 4.3 to about 4.7.

26. The method of claim 23 further comprising the step of drying the texturizing agent into a powder.

27. The method of claim 23 wherein the texturizing agent is dried by spray drying.

28. The method of claim 23 wherein step (a) is performed by jet cooking.

29. The method of claim 23 wherein the excipient is maltodextrin.

* * * * *